Nov. 29, 1932.    G. H. HEYS    1,889,245
HEEL AND HEEL COVERING AND METHOD OF MAKING THE SAME
Filed Oct. 9, 1930
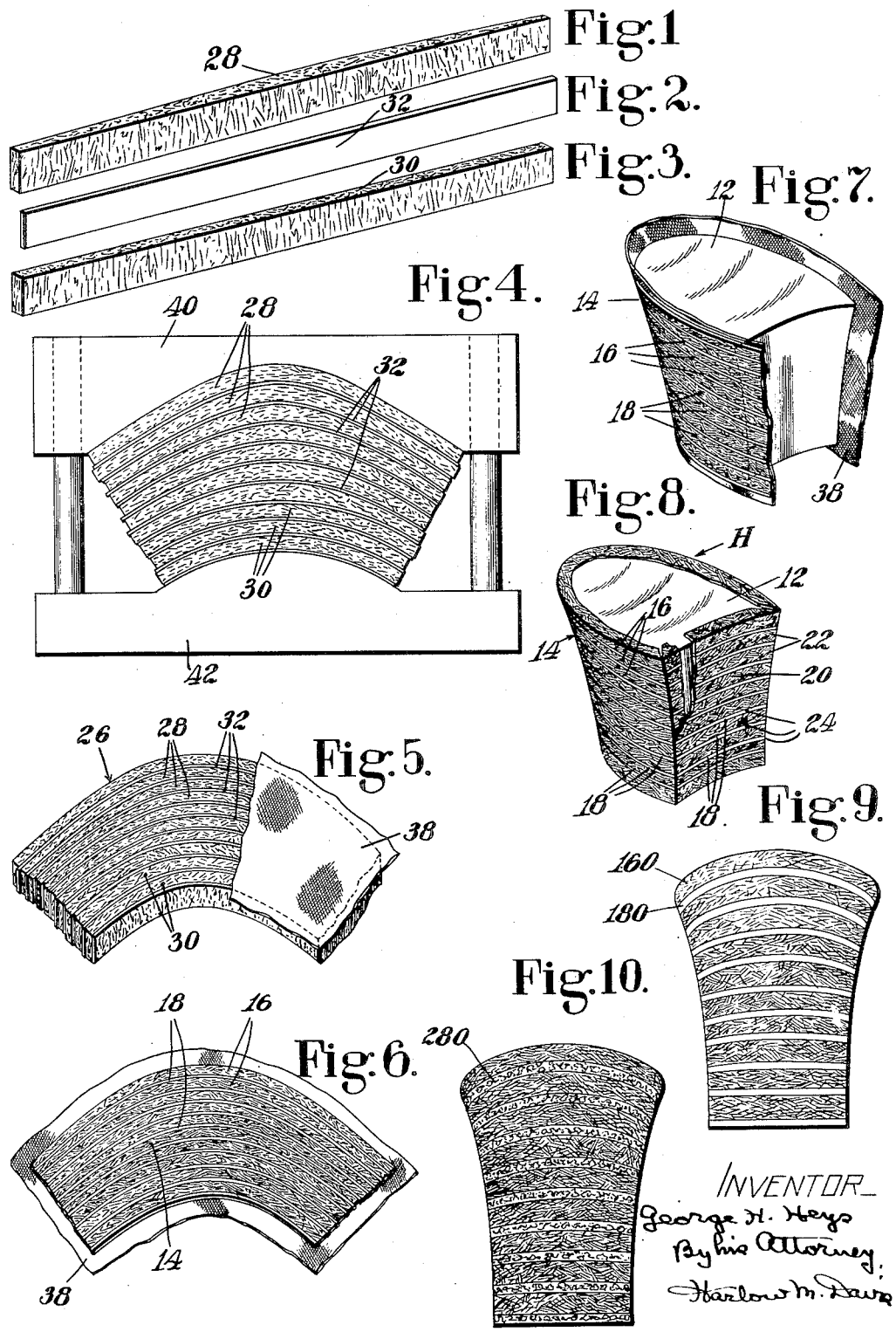

Patented Nov. 29, 1932

1,889,245

UNITED STATES PATENT OFFICE

GEORGE H. HEYS, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY

HEEL AND HEEL COVERING AND METHOD OF MAKING THE SAME

Application filed October 9, 1930. Serial No. 487,530.

This invention relates to methods of making heels and heel coverings and to improvements in covered heels and heel coverings.

By the invention disclosed in co-pending application Serial No. 413,370, filed December 11, 1929, in the name of Lewis J. Bazzoni, there is provided a novel heel characterized by having a covering so made and applied that the covered heel has the appearance of being composed of solid leather lifts. To obtain this effect, as heretofore made the covers of heels of the type referred to have been cut from blocks composed of layers of sole leather secured together in face-to-face relation and molded into a form having a cross-sectional contour corresponding to the marginal outline of a heel cover, a plurality of covers being formed by cutting crosswise of the layers of the block so that each cover consists of a plurality of thin leather strips arranged in abutting edge-to-edge relation, the width of the strips being equal to the thickness of leather lifts such as are ordinarily employed in the making of solid leather heels. Such covers are applied to the heels so that the strips constituting the covers extend around the rear and sides of the heels and, inasmuch as the strips are formed by cutting crosswise through layers of sole leather, the texture or grain of the strips is substantially the same as that of the edge surfaces of the lifts of a built-up leather heel. When applied to a heel the lines formed by the butting edges of the cover strips produce the laminated effect desired in the finished heel.

One object of the present invention is still further to accentuate the laminated effect produced in a heel covered in the general manner above described.

This object is accomplished, considering the present invention in one aspect, by the provision of an improved method of making heel coverings which as herein illustrated, consists in assembling and securing together in alternately disposed face-to-face relation relatively thick pieces of material and relatively thin pieces of sheet material contrasting in appearance with that of said relatively thick pieces to make a laminated block, and cutting the block crosswise of its laminations to make heel covers composed of alternately arranged relatively wide and narrow strips. The illustrated relatively wide layers or pieces constituting the block are strips of sole leather stock of a thickness corresponding to that of heel lifts, and the relatively thin layers constituting the block are strips of white celluloid and the block is molded so that a cross-section in a plane parallel to the edge faces of the strips will have the marginal contour of a heel cover. The blocks are preferably made of such thickness that a plurality of heel covers may be produced by successively splitting or cutting through the block in planes parallel to the edge faces of the component strips. In the covers thus produced the narrow celluloid strips serve to accentuate the lift lines and thus to emphasize the laminated effect so that the heels, even when viewed from a distance, will appear to be built up of leather lifts.

The invention resides also in improvements in methods of manufacturing covered heels, and in improvements in heels and heel covers as articles of manufacture, as will be hereinafter described and claimed.

The invention will be explained with reference to the accompanying drawing, in which Fig. 1 is a perspective view of one of the tapering or wedge-shaped leather strips employed in the making of a laminated block such as that employed in the making of heel covers embodying features of the present invention;

Fig. 2 is a perspective view of one of the thin celluloid strips which are arranged alternately with the leather strips in the block from which the covers are cut;

Fig. 3 is a perspective view of one of a plurality of leather strips of uniform thickness employed in the making of the cover block;

Fig. 4 is a plan view of a mold used in the manufacture of the cover blocks, showing a cover block in the process of being molded;

Fig. 5 is perspective view of a molded heel cover block;

Fig. 6 is a perspective view of a heel cover formed by splitting a thin skiving from the block shown in Fig. 5, the covering having a fabric backing secured thereto;

Fig. 7 is a perspective view of a wooden Cuban heel in process of being covered with a liminated cover, such as that shown in Fig. 6;

Fig. 8 is a perspective view of a Cuban heel as it appears after being covered;

Fig. 9 is a rear elevational view of a covered heel having a modified form of covering thereon; and Fig. 10 is a rear elevational view of a heel having a still further modified form of covering thereon.

Referring to the drawing, there is shown in Fig. 8 a covered heel H embodying certain features of the present invention. The illustrated heel H comprises a wooden heel or heel body 12 and a heel cover 14, the heel 12 being of a type commonly used in the manufacture of Cuban heels and the cover 14 being composed of a plurality of strips 16 of substantial width and a plurality of strips 18 which are relatively narrow. The illustrated strips 16 are made of leather and, as in the heel cover disclosed in the co-pending application Serial No. 413,370 above referred to, the characteristics of the strips 16 and the arrangement of the strips in the cover are such that when the cover is applied to a heel the strips 16 simulate the appearance of the edge faces of the lifts of a solid leather heel. To this end, the illustrated strips 16, in common with the strips constituting the heel cover disclosed in said application, are arranged to extend around the rear and sides of a heel, the strips being of widths corresponding to the thickness of heel lifts and being formed by cutting or skiving pieces of sole leather stock in directions crosswise of the grain so that the grain or fiber of the leather in the strips 16 extends edgewise to the surfaces of the strips and is in all respects similar to the grain or texture of the edge faces of leather heel lifts.

The strips 18 of the illustrated heel cover 14 are employed for the purpose of accentuating the laminated or striped effect produced by the strips 16 and to this end the illustrated strips 18 which may be termed "accent" strips, are made of material contrasting sharply in color and surface texture with that of the leather strips 16 and the strips 16 and 18 are arranged in alternation so that a relatively narrow strip 18 is located between each pair of adjacent strips 16.

It has been found satisfactory to make the accent strips 18 of white celluloid although other materials and other colors may be employed. For example, the desired laminated or striped effect may be obtained by the use of material for the strips 18 which is either darker or lighter than the leather strips 16. As shown, the inserted strips 18 are sufficiently narrow so that in the finished heel they appear merely as lines separating or differentiating between the leather strips 16. Thus, the laminated effect is made more pronounced and the heel, even when viewed from a distance, will have the appearance of being built up of superposed heel lifts. Preferably, the strips 16 and 18 are adhesively secured together at their adjacent abutting edges and all the strips are curved edgewise, as shown, so that the covering will be shaped as required to fit a heel. Inasmuch as heels are higher at their rear portions than at their breasts, a majority of the leather strips 16 are made slightly wider at their middle portions than at their end portions thus making these strips 16 somewhat wedge-shaped so that the middle portion of the cover will be wider than the end portions thereof. As shown, the wedge strips 16 are located in the upper portion of the heel cover (i. e., the portion nearer to the attaching face of the heel when the cover is applied), the leather strips at the lower portion of the illustrated cover being made of uniform width throughout their lengths. The number of wedge strips employed may be greater or less in proportion to the number of strips of uniform thickness according to the difference in height between the rear and breast face of the heel to be covered. The covering herein shown is made wide enough to overlap the attaching and top-lift-receiving faces of a heel in the usual manner and long enough to overlap the lateral margins of the breast face of the heel without, however, entirely covering the breast face, the latter being covered by a separate covering such as that indicated at 20 in Fig. 8.

As shown, the breast covering 20 is composed of a series of relatively wide leather strips 22 and a series of relatively narrow celluloid strips 24, the strips 22 and 24 corresponding, respectively, to the strips 16 and 18 of the cover 14 and being alternately arranged as in the cover 14. Breast coverings 20 may be produced in a manner similar to that already described in connection with the production of the side coverings 14, viz., by successively cutting thin strips or skivings from blocks made up of alternate layers of sole leather and celluloid of thickness corresponding respectively to the thickness of the strips 20 and 22, the layers constituting the block being all of uniform thickness, however, and being adhesively secured together in face-to-face relation before being skived. If desired one-piece coverings of any suitable material, such as leather or celluloid, may be employed for covering the heel breast. Also, if desired, the side covering 14 may be made long enough to cover the breast as well as the rear and side faces of the heel in which case the opposite ends of the cover may be overlapped upon the breast face or trimmed to provide a butted joint.

Heel covers like the illustrated cover 14 are made as herein exemplified by successive cutting or skiving operations performed upon a laminated heel cover block, such as the block 26 shown in Fig. 5, the block being composed of alternately arranged layers of relatively thick sole leather stock and relatively thin pieces of sheet celluloid. As herein illustrated, the block 26 is built up of a plurality of layers or strips of leather, such as the strips 28 and 30 shown in Figs. 1 and 3, and a plurality of layers or strips of celluloid, such as the strip shown at 32 in Fig. 2. The leather strips 28 are skived before being assembled with the other strips constituting the block so as to make the strips 28 somewhat tapering or wedge-shape in longitudinal section to correspond to the wedge-shape required in the strips 16 of the covers. As shown, the strips 28 are of maximum thickness at their middle portions and taper gradually toward their opposite ends. The strips 30, however, are of uniform thickness throughout their length, and thickness corresponding to that at the middle portions of the strips 28. Thin strips 32 (Fig. 2) of celluloid are interposed between the adjacent leather strips 28 or 30 throughout the width of the block, as shown in Figs. 4 and 5.

In making the block the leather strips and the celluloid strips are preferably first bent or rough molded to approximately the curvatures of the block engaging faces of the mold members 40 and 42, the number and the degree of taper of the wedge strips depending of course upon the shape and style of the particular heel to be covered. The rough molding of the strips takes place while the strips are in temper and consists merely in bending the strips by hand into substantially the shapes shown in Figs. 4 and 5. Before the strips are laid in the mold or while they are being produced herein, each of the leather strips and each celluloid strip is coated upon its side faces with pyroxylin cement before being placed in the mold.

After the strips have been assembled between the mold members to make the block, pressure is applied in any suitable manner to the mold members to consolidate the material of the strips and to impart the desired final shape to the block, the pressure being maintained to insure drying of the leather and setting of the adhesive. After being molded the block is shaped as shown in Fig. 5.

The heel covers are formed from the block 26 by cutting or skiving in planes parallel to the top and bottom faces of the block. Thus, thin covers are produced which are of the same shape in outline as that of the block and which are composed of alternating relatively narrow strips of leather and celluloid, the celluloid strips contrasting in color with that of the leather strips so as to accentuate the lines or joints between the strips.

As shown in Fig. 6, the cover 14 is reinforced by a sheet of backing material, such as the fabric backing 38, the fabric being preferably cut on the bias as indicated so as to enable it to stretch more readily to conform to the curvature of the heel. Preferably, as indicated in Fig. 5, a sheet of backing material 38 is applied to the surface of the block 26 before each skiving operation so that each cover will be reinforced as it is skived from the block.

A covering 14, made as above described, is applied to a heel in the usual manner, i. e., by wrapping the covering around the rear and sides of the heel, suitable adhesive being employed to secure the covering in place, and laying the projecting margins of the covering against the attaching, the top-lift-receiving and the breast faces of the heel. After a cover has been thus applied it may be buffed and then coated with suitable finishing material such as glue sizing, pyroxylin or lacquer. If a finish of a color or shade other than the natural color or shade of the leather is desired this may be obtained by the application of a suitable strain to the cover before the lacquer or other finishing material is applied. If desired, the heel covers may finally be waxed and polished by means of a rag wheel.

In the cover shown in Fig. 6, the presence of the narrow celluloid strips 18 serves to emphasize the laminated or striped appearance of the cover and after the cover has been applied to the heel the narrow strips 18 appear merely as lines clearly differentiating between the relatively wide leather strips 16, thus making the heel appear even more like a built-up leather heel than if the strips 18 were not present in the cover.

In Fig. 9 there is shown a heel having a cover thereon constructed in accordance with the present invention and comprising alternately disposed leather strips 160 and celluloid strips 180, the strips 180 being somewhat wider than the celluloid strips shown, for example, in Figs. 6, 7 and 8, and being of the same color as the leather strips 160, but of a somewhat lighter shade, so as to simulate the relatively smooth texture and appearance of the grain portion of a sole leather lift. When celluloid strips, such as the strips 180, are employed, it is practicable to form the leather strips 160 from pieces of sole leather from which the grain surface has been removed, leaving only the relatively coarse flesh portion of the leather, the celluloid strips 180 being relied upon in such a case to give the effect of the grain surface of the leather. Thus, leather stock of inferior quality may be used in the making of heel covers while the effect obtained will be the same as if a better quality of leather were employed.

The celluloid strips may be made of mottled celluloid, as indicated at 280 in Fig. 10. As shown, the mottled effect may be such as to simulate the fiber or texture of either the flesh or grain portion of sole leather. The use of celluloid strips such as the strips 280 makes it practicable to produce a heel cover simulating a leather cover with the use of less leather than would be possible without the use of the celluloid strips.

Having described my invention, what I claim as new and desire to secure by Letters Patent of the United States is:

1. That improvement in methods of making heel covers of the type comprising a plurality of strips corresponding in width, arrangement and surface appearance to that of the edge faces of the lifts of a built-up leather heel, which consists in arranging between adjacent members of a plurality of layers of leather, each of a width corresponding to the width of a heel lift, relatively narrow layers of material contrasting sharply with the leather layers to accentuate the laminated appearance of the heel covers subsequently to be formed from the assembled layers and successively slicing the assembled layers in planes parallel to the edge faces of the component strips to make individual heel covers.

2. That improvement in methods of making heel covers, which consists in assembling in alternately disposed face-to-face relation strips of sole leather stock each of a thickness corresponding to the width of a heel lift and relatively thin strips of sheet material of a color or shade contrasting with that of said leather stock, securing said strips together in the relation specified to make a laminated block, and successively slicing said block crosswise of its laminations in planes parallel to the edge faces of said strips to make heel covers composed of thin alternately arranged strips of leather and of said sheet material disposed in abutting edge-to-edge relation.

3. That improvement in methods of making heel covers, which consists in assembling in alternately disposed face-to-face relation relatively thick strips of sole leather and relatively thin strips of white celluloid, securing said strips together in the relation specified to make a laminated block, and cutting said block crosswise of said lamination to make heel covers comprising alternately disposed thin strips of leather and celluloid disposed in abutting edge-to-edge relation.

4. That improvement in methods of making covered heels which consists in securing together flatwise a plurality of layers of relatively thick pieces of sheet material and a plurality of layers of relatively thin pieces of sheet material with said relatively thick and said relatively thin pieces arranged in alternation, cutting the block crosswise of its laminations to produce a heel cover composed of thin, alternately disposed relatively wide and narrow strips of contrasting appearance secured together in abutting edge-to-edge relation, and wrapping the cover around and comforming it to the contour of the curved rear and sides of the heel with the component strips of the cover extending from one lateral breast corner of the heel to the other.

5. That improvement in methods of making covered heels which comprises assembling in alternating face-to-face relation and adhesively securing together a plurality of layers of leather and celluloid to make a laminated block having opposite surfaces formed by the edge faces of said layers, cutting the block crosswise of its laminations and in a plane parallel to said surfaces to form a heel cover composed of thin, curved strips disposed in abutting edge-to-edge relation, and applying the cover to a heel with the component strips of the cover extending around the rear and sides of the heel.

6. A heel having a cover comprising a plurality of relatively wide strips of leather and a plurality of relatively narrow strips of celluloid, said leather strips and said celluloid strips being of contrasting colors or shades and being arranged in alternation, the strips extending around the rear and sides of the heel.

7. A heel having a cover comprising a plurality of thin, curved strips of leather each of a width substantially equal to the thickness of a heel lift, and a plurality of thin and relatively narrow curved strips of material contrasting in appearance with that of the leather strips, the relatively narrow strips being arranged in alternation with the leather strips, and adjacent strips being disposed in abutting edge-to-edge relation.

8. A heel having a thin cover comprising a plurality of relatively wide strips each tapering from its middle portion toward its opposite ends, and a plurality of relatively narrow strips each of uniform width throughout its length, said relatively wide strips and said relatively narrow strips being of contrasting colors or shades and being arranged in alternation, the strips being curved to extend around the rear and sides of the heel and being disposed with adjacent strips in abutting edge-to-edge relation.

9. A heel having a cover comprising a plurality of relatively wide strips and a plurality of relatively narrow strips, said relatively wide strips and said relatively narrow strips being of contrasting colors or shades and being arranged in alternation, the strips extending around the rear and sides of the heel, said relatively wide strips comprising a plurality of wedge-shaped strips and a plurality of strips of uniform thickness arranged to simulate the arrangement of lifts in a solid leather heel.

10. A heel having a covering comprising a plurality of relatively wide strips of leather extending around the rear and sides of the heel, said strips comprising a plurality of wedge-shaped strips located upon the upper portion of the heel and a plurality of strips of uniform width located upon the lower portion of the heel, and a plurality of relatively narrow strips of a color or shade contrasting with that of said leather strips, said relatively narrow strips being arranged in alternation and in abutting edge-to-edge relation with said leather strips.

11. A heel having a covering comprising a plurality of strips of leather from which the grain surface has been removed, and a plurality of strips of material treated to simulate the appearance of the grain surface of leather, said leather strips being arranged in alternation with the other strips and all of the strips being arranged to extend around the rear and sides of the heel.

12. A heel having a covering comprising a plurality of relatively wide strips of leather from which the grain surface has been removed, and a plurality of relatively narrow strips of a material contrasting in color with that of the leather strips for simulating the appearance of the grain surface of leather, said strips being arranged in alteration with said leather strips and all of the strips being arranged to extend around the rear and sides of the heel.

13. A heel having a covering comprising a plurality of thin strips of leather from which the grain surface has been removed and a plurality of thin strips of mottled celluloid for simulating the appearance of the grain surface of leather, said leather strips and said celluloid strips being arranged in alternation and extending around the rear and sides of the heel and being disposed in abutting edge-to-edge relation to impart to the heel the surface appearance of leather lift edges.

14. A heel having a covering on its rear and side surfaces comprising a plurality of strips of leather each of a width substantially equal to the thickness of a heel lift, and a plurality of relatively narrow strips of material of a color or shade contrasting with that of the leather strips, all the strips extending around the rear and sides of the heel and the relatively narrow strips being arranged to alternate with the leather strips, and a separate covering for the heel breast composed of a plurality of strips of leather and a plurality of strips of material of a color contrasting with the leather, the leather strips and the other strips constituting said breast covering being arranged in alternation and extending in directions crosswise of the heel breast.

15. A heel cover comprising a plurality of thin strips of leather each of a width substantially equal to the thickness of a heel lift, and a plurality of relatively narrow, thin strips of material of a color or shade contrasting with that of the leather strips, the strips extending around the rear and sides of the heel in abutting edge-to-edge relation and the relatively narrow strips being arranged in alternation with the leather strips.

16. A heel cover comprising a plurality of relatively wide strips of leather from which the grain surface has been removed, and a plurality of relatively narrow strips of other material simulating the appearance of the grain surface of leather, said relatively narrow strips being arranged in alternation with said leather strips and all of the strips being arranged to the extent around the rear and sides of a heel with adjacent strips in abutting edge-to-edge relation.

In testimony whereof I have signed my name to this specification.

GEORGE H. HEYS.